United States Patent
Lin et al.

(10) Patent No.: US 7,356,763 B2
(45) Date of Patent: Apr. 8, 2008

(54) REAL-TIME SLIDE PRESENTATION MULTIMEDIA DATA OBJECT AND SYSTEM AND METHOD OF RECORDING AND BROWSING A MULTIMEDIA DATA OBJECT

(75) Inventors: I-Jong Lin, Woodside, CA (US); Ramin Samadani, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1271 days.

(21) Appl. No.: 09/952,642

(22) Filed: Sep. 13, 2001

(65) Prior Publication Data

US 2004/0205478 A1 Oct. 14, 2004

(51) Int. Cl.
*G06F 15/00* (2006.01)

(52) U.S. Cl. ............... 715/500.1; 715/716; 715/732

(58) Field of Classification Search ......... 715/500.1, 715/730; 434/276; 709/204; 463/1; 386/120; 348/333.05, 14.07; 375/240.26; 345/473, 345/776, 839, 753, 15, 330, 730
See application file for complete search history.

(56) References Cited

U.S. PATENT DOCUMENTS

| | | | | |
|---|---|---|---|---|
| 5,528,263 A | * | 6/1996 | Platzker et al. | 345/156 |
| 5,692,213 A | * | 11/1997 | Goldberg et al. | 715/500.1 |
| 5,767,897 A | * | 6/1998 | Howell | 348/14.07 |
| 6,084,582 A | | 7/2000 | Qureshi et al. | |
| 6,155,840 A | * | 12/2000 | Sallette | 434/323 |
| 6,249,281 B1 | * | 6/2001 | Chen et al. | 715/753 |
| 6,452,615 B1 | * | 9/2002 | Chiu et al. | 345/776 |
| 6,697,569 B1 | * | 2/2004 | Gomez et al. | 386/120 |
| 2001/0020954 A1 | * | 9/2001 | Hull et al. | 345/730 |
| 2002/0197593 A1 | * | 12/2002 | Sutton | 434/276 |

FOREIGN PATENT DOCUMENTS

| | | |
|---|---|---|
| EP | 0947948 | 10/1999 |
| WO | WO0021065 | 4/2000 |
| WO | WO0165378 | 9/2001 |

OTHER PUBLICATIONS

Adobe Premiere 5.0 "Classroom in a Book"—by staff of Adobe—published 1998 by Adobe System Incorporated—pp. 11. 15-16, 26-27, 184, 352-353, 49, 1-9, 73-74 and 186.*

(Continued)

*Primary Examiner*—Doug Hutton
*Assistant Examiner*—Tran A Quoc

(57) ABSTRACT

A system for recording a real-time slide presentation to generate a low bit-rate multimedia data object including a plurality of synchronized overlayed replayable bitstreams including at least a bitstream corresponding to an image of each of a plurality of slides of the slide presentation, a bitstream corresponding to symbolic representations of presenter's interactions with points of interest within each slide, and a bitstream corresponding to a presenter's audio associated with each slide is described. The plurality of bitstreams can be linked so as to make the multimedia data object browsable on a presenter interaction event-by-event basis. Interaction events can be linked to the audio bitstream and/or to a video clip bitstream. Video clips can be recorded during the real-time presentation such that when replaying the multimedia data object, a video clip is synchronized and replayed dependent on presenter interaction events.

15 Claims, 7 Drawing Sheets

OTHER PUBLICATIONS

Rahul Sukthankar, Tat Jen Cham, Gita Suktankar & Jim Rehg—Website URL:http://crl.research.compaq.com/vision/interfaces/projector/—"Smart Projectors"—Jun. 6, 2001—p. 1—Cambridge Research Laboratory.

Rahul Sukthankar, Robert Stockton % Matthew Mullin—Website URL:http://www.cs.cmu.edu/~rahuls/Research Projector/—"Camera-Assisted Presentation Systems"—pp. 1-4.

Rahul Sukthankar—Website URL: http://www/cs/cmu.edu/~rahuls/Research/Projector/keystone.html_"Automatic Keystone Correction"—p. 1.

Hurst W. et al: "A synchronization model for recorded presentation and its relevance for information retrieval" Proceedings of ACM Conference on Multimedia 1999, Orlando, FL, USA, Oneline! Oct. 30, 1999-Nov. 5, 1999, pp. 333-342, XP002260128.

Iwamoto et al: "Operations on Actions streams for Hypermedia Presentation" Proceedings of IEEE International Conference on Systems, MAN, and Cybernetics, Tokyo Japan, Oct. 12-15, 1999, pp. 188-193, XP010362743.

Staff of Adobe: "Adobe Premiere 5.0, Classroom In A Book", 1998; 29 pages; published by Adobe System Incorporated.

* cited by examiner

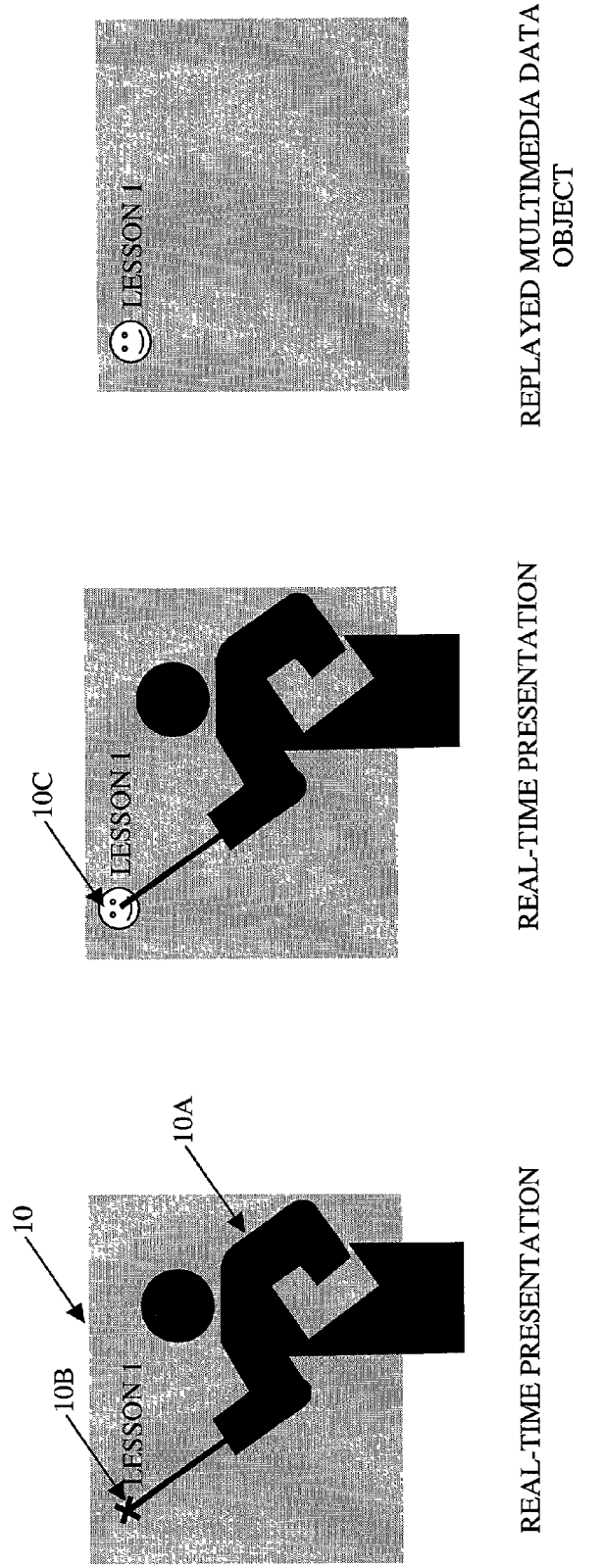

- BITSTREAM CORRESPONDING TO COMPUTER GENERATED IMAGE DATA OF EACH SLIDE IN THE SLIDE PRESENTATION
+
- BITSTREAM CORRESPONDING TO PRESENTER AUDIO CONTRIBUTION
+
- BITSTREAM CORRESPONDING TO SYMBOLIC REPRESENTATION OF PRESENTER INTERACTION WITH EACH SLIDE
MULTIMEDIA DATA OBJECT SYNCHRONIZED OVERLAYED BITSTREAMS
FIG. 2
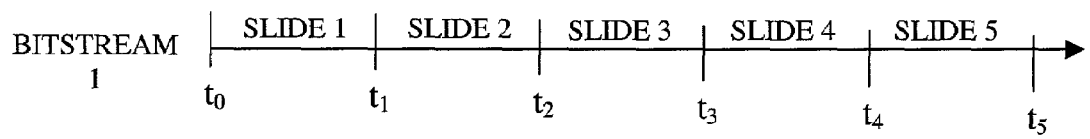
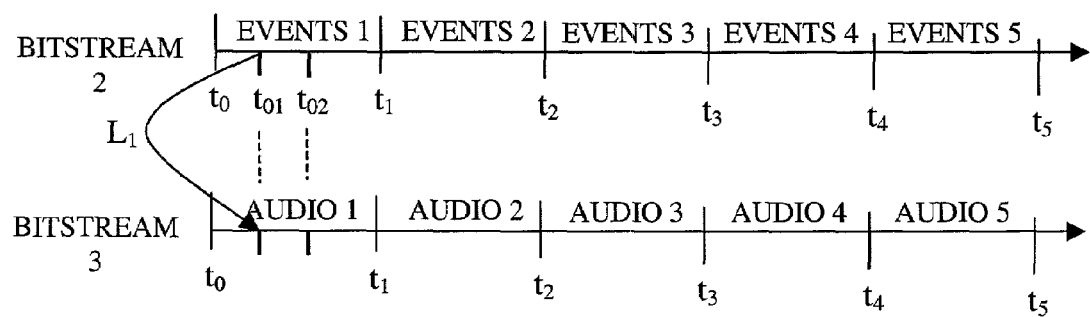
FIG. 3

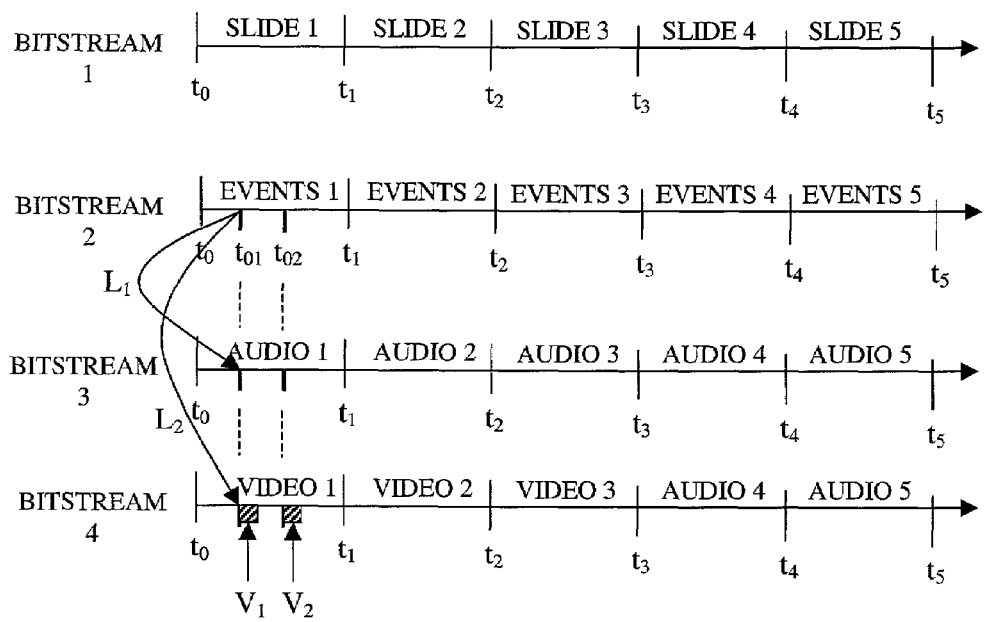

- BITSTREAM CORRESPONDING TO COMPUTER GENERATED IMAGE DATA OF EACH SLIDE IN THE SLIDE PRESENTATION
  +
- BITSTREAM CORRESPONDING TO PRESENTER AUDIO CONTRIBUTION
  +
- BITSTREAM CORRESPONDING TO SYMBOLIC REPRESENTATION OF PRESENTER INTERACTION EVENT WITH EACH SLIDE
  +
- BITSTREAM CORRESPONDING TO A PLURALITY OF VIDEO CLIPS CAPTURED DEPENDENT ON PRESENTER INTERACTION EVENT

MULTIMEDIA DATA OBJECT SYNCHRONIZED OVERLAYED BITSTREAMS

REAL-TIME SLIDE PRESENTATION MULTIMEDIA DATA OBJECT AND SYSTEM AND METHOD OF RECORDING AND BROWSING A MULTIMEDIA DATA OBJECT

FIELD OF THE INVENTION

The present invention relates to a computer controllable display system and in particular, this disclosure provides a multimedia data object representing a real-time slide presentation, a system for recording a multimedia data object, and a system and method of creating a browsable multimedia data object on a presenter interaction event-by-event basis.

BACKGROUND OF THE INVENTION

Computer controlled projection systems generally include a computer system for generating image data in the form of a slide presentation and a projector for projecting the image data onto a projection screen. Typically, the computer controlled projection system is used to allow a presenter to project presentations that were created with the computer system onto a larger screen so that more than one viewer can easily see the presentation. Often, the presenter interacts with the projected image by pointing to notable areas on the projected image with his/her finger, laser pointer, or some other pointing device or instrument.

It is common that if an individual is unable to personally attend and view a slide presentation, they can instead obtain a digital copy of the slides shown at the presentation and view them at a later time on their personal computer system. In this way, they are able to at least obtain the information within the slides. However, later viewing of the slides is lacking in that the slides do not include the additional information that was imparted by the presenter during the presentation, such as the verbal annotations of each slide as well as the interaction of the presenter with each slide. Moreover, the synchronization between each verbal annotation and a corresponding presenter interaction with each slide is also lost when later viewing. For example, during a presentation a speaker often points to an area of interest within a slide while simultaneously providing a verbal annotation relating to the particular area within the slide. This type of information is lost when a viewer is simply provided with a set of slides to view at a later time.

One manner to overcome the above problem is to videotape the presentation so that the viewer can replay the videotape of the presentation and see the presenter's interaction with the slides and hear the presenter's audio description of the slides while at the same time viewing the slides. However there are several drawbacks with a video-taped presentation. First, video-taped presentations use a relatively large amount of storage and require a relatively large amount of bandwidth to transmit and/or download. Because of this, it can be either difficult or impossible to obtain and view a video-taped presentation in situations in which storage or bandwidth is limited. Secondly, even though a video-taped presentation captures all of the desired elements of the slide presentation (i.e., the slides, the presenter's interaction with the slides, and the presenter's audio) the video-taped slides potentially may not be clear or readable because of resolution limitation of the video recording device or because the presentation is not recorded properly. For instance, during video taping the presenter may accidentally block the line of sight between the video camera and the slides such the slides are not visible or clear within the video-taped presentation.

Another disadvantage is that it may be inconvenient to video-tape the slide presentation. In addition, this technique requires an additional person to operate the video equipment. Finally, professional video taping of a presentation requires expensive or specialized production equipment.

An alternative to video taping a presentation is to simply record the presenter's audio during the presentation. In one known technique, portions of the audio are associated with specific slides such that when a slide is replayed, the associated audio is also replayed. Unfortunately, this solution is lacking in that it does not provide the viewer with the presenter's interaction with the slide presentation that may impart additional information.

Hence, what is needed is a means of providing a recording of a real-time slide presentation that incorporates the information imparted by the slides, the presenter's physical interactions with the slides, and the presenter's audio contribution in a synchronous manner so as to produce a coherent replayable recording of the real-time presentation.

SUMMARY OF THE INVENTION

A multimedia data object comprises a data stream including a plurality of synchronized overlayed replayable bitstreams representing a previously captured recording of a real-time computer controlled slide presentation and a presenter's interaction with slides displayed in a computer controllable display area. The bitstreams include at least a first bitstream corresponding to each of a plurality of slides of the slide presentation, a second bitstream corresponding to a symbolic representation of each presenter interaction with a point(s) of interest within each slide during the presentation, and a third bitstream corresponding to the audio portion of the presenter during the presentation. The plurality of synchronized overlayed bitstreams are replayable using a computer system such that while each slide is replayed, the symbolic representation of the presenter's interactions are overlayed upon the slide and the audio corresponding to the slide is replayed. In one embodiment, the multimedia data object further includes a fourth bitstream corresponding to captured video clips of the real-time presentation.

In another embodiment, the symbolic interaction event bitstream is linked to another bitstream of the plurality of bitstreams on an interaction event-by-event basis. When the location of a symbolic presenter's interaction event is selected within a replayed slide of the multimedia data object, a portion of the other bitstream that was captured at the same time as the interaction event during the real-time presentation is also replayed. The bitstreams are linked when capturing and recording the real-time slide presentation in response to the detection of a presenter's interactions with a point of interest within the displayed slides. In one embodiment the other bitstream corresponds to the captured audio portion of the presentation. In another embodiment, the other bitstream corresponds to a plurality of captured video clips of the real-time presentation where the video clips are captured in response to the detection of a presenter's interaction during the real-time slide presentation.

The present invention further includes a method of creating a browsable multimedia data object having a plurality of overlayed replayable bitstreams. The method includes capturing a real-time slide presentation to obtain an image signal and an audio signal. Location within a given bitstream of a multimedia data object is tracked while capturing and recording the multimedia data object. A presenter interaction with a region of interest within a slide is detected while capturing and recording the multimedia data object such that in the event of a detected interaction, the interaction event is linked with a location within the given bitstream captured at the same time of the interaction event. In one embodiment, the interaction event is linked to a location within the audio bitstreams captured at the time of the interaction event. In another embodiment in which the multimedia data object includes a bitstream corresponding to a plurality of video clips, the interaction event is linked to a video clip.

A system of creating a browsable multimedia data object includes a means for capturing a real-time slide presentation to obtain an image signal and an audio signal corresponding to the presentation and a means for recording a multimedia data object comprising a plurality of bitstreams including at least a bitstream corresponding to the symbolic representation of presenter interaction within the displayed slides. A first means functions to track location within a bitstream other than the presenter interaction bitstream of the multimedia data object. The system further includes a second means for detecting each presenter interaction with a region of interest within a slide where the detected presenter interaction has a corresponding symbolic interaction event within the symbolic interaction bitstream of the multimedia data object. A third means links each symbolic interaction event to a corresponding tracked location occurring within the tracked bitstream at the time of the symbolic interaction event. In one embodiment, the interaction event is linked to a corresponding tracked location within the audio bitstream captured at the time of the interaction event. In still another embodiment, the interaction event is linked to a corresponding tracked location within the video clip bitstream captured at the time of the interaction event.

BRIEF DESCRIPTION OF THE DRAWINGS

FIG. 1B illustrates a presenter's interaction with a point of interest within the display area of a displayed slide presentation;

FIG. 1C illustrates the insertion of a symbolic representation of the presenter's interaction within the displayed slide presentation shown in FIG. 1B;

FIG. 1D shows a replayed slide of a multimedia data object including a symbolic representation of a previously recorded presenter's interaction shown in FIG. 1C;

FIG. 2 shows a first embodiment of a multimedia data object including a plurality of bitstreams;

FIG. 3 shows the synchronization of the plurality of bitstreams of a multimedia data object shown in FIG. 2;

FIG. 4 shows a second embodiment of a multimedia data object including a plurality of bitstreams corresponding to the plurality of video clips;

FIG. 5 shows the synchronization of the plurality of bitstreams of a multimedia data object shown in FIG. 4;

DETAILED DESCRIPTION OF THE INVENTION

Figure 1A:
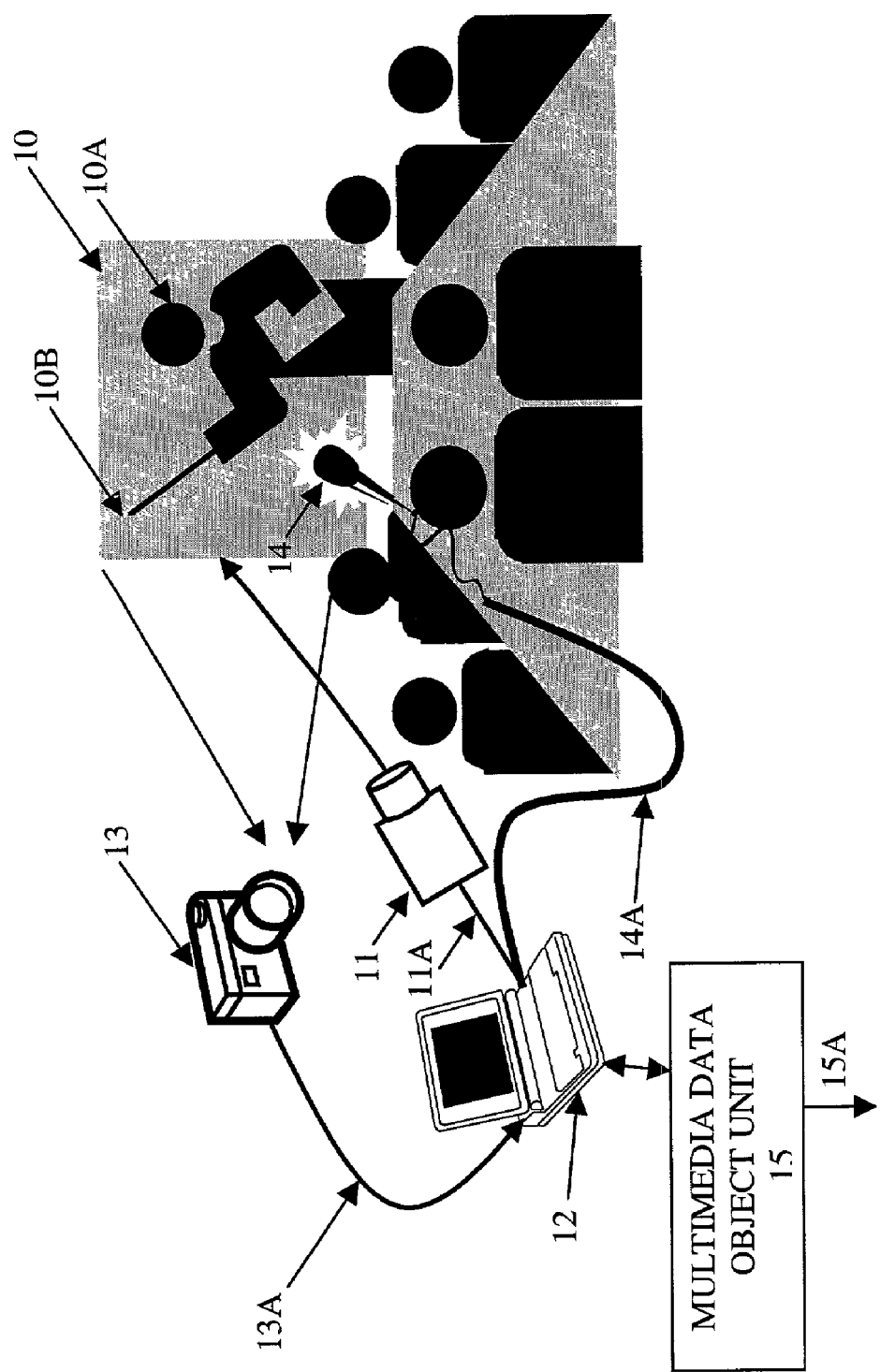
FIG. 1A illustrates an example of a system for capturing a real-time slide presentation and for generating a multimedia data object representing the presentation.

FIG. 1 shows an example of a system for capturing a real-time computer controlled slide presentation and for generating a multimedia data object representing the presentation. A display area 10 displays a plurality of slides (not shown) while a presenter 10A is positioned in front of the display area so as to present the slides. In this example, a projector 11 displays the slides. The projector is driven by an image signal 11A provided by a laptop computer 12 that represents the slides. It should be understood that other arrangements for displaying a computer controllable slide presentation are well known in the field. As each slide is shown in a generally sequential manner, the presenter 10A adds verbal annotations describing its contents while pointing at points of interest within it. For instance, the presenter may point to a bullet point within the slide and then add a verbal description of the text adjacent to the bullet point. The action of the presenter pointing at a point of interest within the slide is herein referred to as a presenter interaction.

During the real-time slide presentation, the multimedia data object unit 15 may function to cause a symbol to be displayed at the point of interest within the slide that the presenter interacts with during the real-time slide presentation. Specifically, as will be herein described below, multimedia data object unit 15 is 1) calibrated so as to be able to identify the location of the display area within the image capture device capture area, 2) able to identify and locate objects in front of the display area including a presenter and/or an elongated pointing instrument, and 3) able to locate a point of interest of the objects in front of the display area such at the tip of the elongated pointing instrument. As a result, the unit 15 can locate a corresponding point of interest within the image signal 11A corresponding to the slide being displayed and insert a digital symbol representing the presenter interaction with the point of interest during the real-time slide presentation. For instance, the presenter 10A can physically point at a point of interest 10B within the display area 10 (FIG. 1B) residing between the line of sight of the image capture device and the displayed slides, and a selected symbol (10C) will be displayed within the slide at that point (FIG. 1C). This predetermined symbol will be referred to herein as a symbolic representation of the presenter interaction.

Multimedia Data Object

The multimedia data object unit 15 functions to generate a multimedia data object including a plurality of synchronized overlayed replayable bitstreams 15A (FIG. 1) representing the real-time slide presentation captured by image capture device 13 and audio signal capture device 14. Referring to FIG. 2, in one embodiment the bitstreams include a first bitstream corresponding to computer generated image data representing each slide in the presentation provided by the computing system 12, a second bitstream corresponding to a plurality of symbolic representations of the presenter's interactions with each slide, and a third bitstream corresponding to the presenter's audio signal 14A provided by the audio signal capture device 14.

When the plurality of bitstreams 15A are replayed by using a computer controllable display screen and an audio device (i.e., audio speaker), the display area displays the image of each slide according to the first bitstream having synchronously overlayed upon it the symbolic representations of the presenter's interactions corresponding to the second bitstream while the audio device synchronously replays the third audio bitstream. For example, FIG. 1D shows a replayed slide corresponding to the captured image of the real-time slide presentation shown in FIG. 1C. As shown in FIG. 1D, the image of the slide includes the image of the slide (i.e., "LESSON 1") and the overlayed image of the symbolic representation of the presenter's interaction 10C (i.e., the smiley face) replayed according to bitstreams 1 and 2. Note, that although a video image of the presenter is not shown, the presenter's interaction with the slides is still represented within the replayed slide in a low bit format.

It should be noted that the multimedia data object can include additional bitstreams. For example, additional audio and/or video bitstreams can be overlayed upon the bitstreams described above to further enhance the representation of the real-time slide presentation.

Synchronization of the overlayed replayable bitstreams is shown in FIG. 3. The bitstreams are replayable such that at beginning of the display of any given slide within bitstream 1, the corresponding symbolic representation of the presenter's interactions with the given slide within bitstream 2 is synchronously displayed and the corresponding audio track within bitstream 3 is played. For instance, at $t_0$ the slide 1 is displayed and the audio track, audio 1, associated with slide 1 begins to play. At $t_{01}$ a first symbolic representation event occurs such that a first symbolic representation of a presenter's interaction is displayed/overlayed within the slide image. Slide 1 continues to replay as does the audio track until $t_{02}$ wherein a second symbolic representation event occurs such that a second symbolic representation is displayed.

FIG. 4 shows a second embodiment of a multimedia data object 15A including a first bitstream corresponding to computer generated image data representing each slide in the slide presentation provided by the computing system 12, a second bitstream corresponding to the symbolic representations of the presenter interaction with each slide, a third bitstream corresponding to the presenter's audio signal 14A, and a fourth bitstream corresponding to a plurality of video clips that were captured dependent on presenter interaction events.

FIG. 5 shows the synchronization of the bitstreams shown in FIG. 4. As with the embodiment shown in FIG. 2, when the multimedia data object is replayed using a computer controllable display screen and an audio device, the display area replays each slide according to the first bitstream having synchronously overlayed upon it the symbolic representations of the presenter's interaction corresponding to the second bitstream while the audio device replays a third synchronized audio bitstream. In addition, video clips can be replayed dependent on the presenter interaction occurring within each slide, for instance, in a portion of the display screen. For instance, in one embodiment, when a symbolic representation of a presenter interaction is replayed at time $t_{01}$ within slide 1 (FIG. 5), the video clip $V_1$ associated with that presenter interaction is replayed in the corner of the display screen. Note that bitstream 4 does not necessarily comprise a continuous video recording of the presentation. Hence, in the example shown in FIG. 5, once the video clip $V_1$ is replayed no video image is replayed until the next presenter interaction event occurs at time $t_{02}$. In other words, the video clips are captured dependent on presenter interaction event. In one embodiment, the viewer may disable the viewing of the video clips by selecting an option on a user/browser interface. The advantage of recording video clips of the presentation in this manner is that it allows the viewer to see a video recording of the presenter during particular points within the real-time presentation when they are most likely to be doing something of interest while avoiding video recording the full presentation. As a result the size of the multimedia data object is minimized. Hence, the viewer is able to obtain the most information from the multimedia data object with the least amount of bandwidth consumption.

The advantage of the multimedia data objects shown in FIGS. 2 and 4 is that they represent in one application a new content pipeline to the Internet by 1) allowing easy production of slide presentations as content-rich multimedia data objects and 2) enabling a new representation of a slide presentation that is extremely low bit rate. The multimedia data objects enable distance learning applications over low bit rate networks by its compact representation of slide presentations as a document of images and audio crosslinked and synchronized without losing any relevant content of the slide presentation. Furthermore, the multimedia data objects have a naturally compressed form that is also adapted to easy browsing.

According to the present invention a multimedia data object is recorded by initially 1) capturing during the real-time slide presentation an image of the display area 10 (FIG. 1A) displaying the slides and the presenter's interactions with each slide within the display area 10 with an image capture device 13, and 2) capturing the presenter's speech using an audio signal capture device 14. The image capture device 13 and the audio signal recording device 14 provide a captured image signal 13A and the captured audio signal 14A, respectively, to the computing system 12, and more specifically to the multimedia data object unit 15.

Multimedia Data Object Unit

Figure 6:
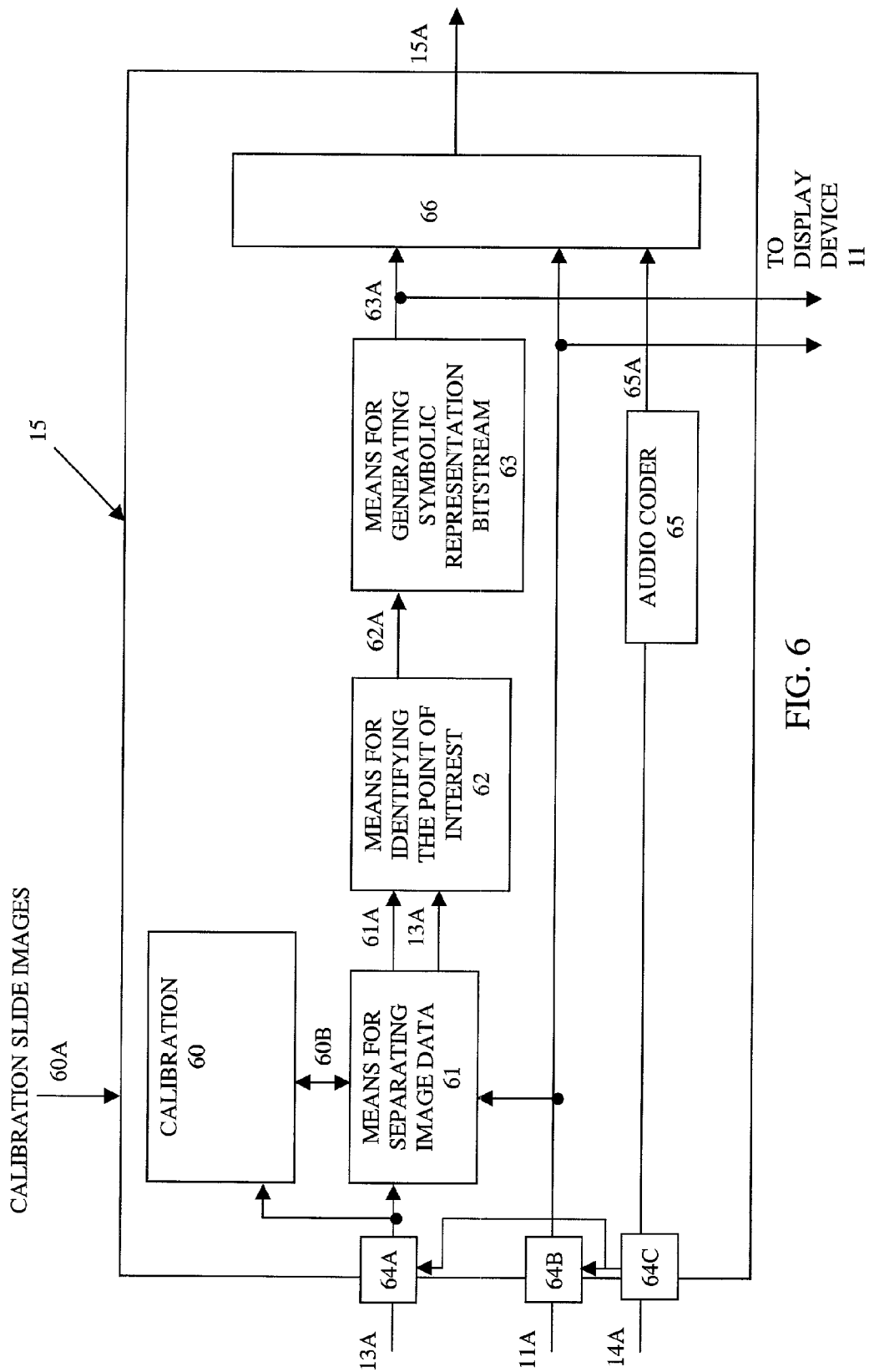
FIG. 6 illustrates one embodiment of a multimedia data object unit.

FIG. 6 shows one embodiment of a multimedia data object unit 15 for generating a plurality of bitstreams 15A as shown in FIGS. 2 and 4. Unit 15 includes a means for calibrating (block 60) that functions to locate the display area within the image capture device view area prior to the real-time slide presentation using calibration images 60A and generate at least a coordinate transform between the signal 11A corresponding to the images displayed within the display area 10 and the signal 13A corresponding to the image captured within the image capture device view area. In one embodiment, the calibration block 60 also includes a pixel value transform for transforming colors displayed within the display area and colors captured by the image capture device. In one embodiment, block 60 is implemented according to the system and method as described in U.S. application Ser. No. 09/774452 filed Jan. 30, 2001, entitled "A Method for Robust Determination of Visible Points of a Controllable Display within a Camera View", and assigned to the assignee of the subject application. However, it should be noted that other methods of locating a display area within the capture area of an image capture device are known such as using a chroma-keying display device. This device sets the display screen to a particular color such as done in blue screening and detects the screen assuming that any image captured within the capture area having that specific color is the display area.

The media data object unit 15 further includes a means for separating image data (block 61) corresponding to objects located within the foreground of the display area 10, for instance, a presenter and/or a pointer. More particularly, the means for separating image data functions to identify objects residing between the line of sight of the capture device 13 and the display area 10 and extract the image data 61A corresponding to the object from the captured image signal 13A. To enable image data separation, calibration unit 60 provides the coordinate transform information to identify the display area within the capture area on interconnect 60B. In one embodiment, block 61 is implemented according to the system and method as described in U.S. application Ser. No. 09/775032 filed Jan. 31, 2001, entitled "A System and Method For Robust Foreground And Background Image Data Separation For Location Of Objects In Front Of A Controllable Display Within A Camera View", and assigned to the assignee of the subject application. However, it should be noted that other methods of identifying objects positioned in front of a display area are known such as motion detection and object tracking.

The multimedia data object unit 15 further includes a means for identifying the location 10B (FIG. 1B), herein referred to as a point of interest, within the slide that the presenter points to with their finger or with any elongated pointing object such as a wooden pointing stick. More particularly, block 62 identifies data 62A within the separated image data 61A that correspond to the general location of where the presenter interacted within a given slides. In one embodiment, block 62 is implemented according to the system and method as described in U.S. application Ser. No. 09/775394 filed Jan. 31, 2001, entitled "System and Method for Extracting a Point of Interest of an Object in Front of a Computer Controllable Display Captured by an Imaging Device", and assigned to the assignee of the subject application. However, it should be noted that other methods of identifying objects positioned in front of a display area are known such as 3-D mice, object tracking, and special gesture recognition.

Each of the identified points of interest 62A is then associated with a symbol by the means for generating the symbolic representation bitstream (block 63). Specifically, at each location corresponding to a point of interest within image data 62A a symbol is inserted by block 63 to generate a bitstream 63A corresponding to the symbolic representation of each of the presenter's interactions. The type of symbol that is inserted can be pre-selected by the presenter prior to the real-time presentation or can be automatically assigned by unit 15. Note that bitstream 63A is transmitted along with the slide image data 11A to the display device 11 during the real-time presentation, so that the symbolic representation is displayed at the location of the current point of interest within the slide such as shown in FIG. 1C.

In one embodiment, the captured image data 13A and the slide image data 11A are intermittently time stamped (blocks 64A-64C) according to the duration of the audio signal 14A. The audio signal is then converted into a digital signal by audio coder 65 to generate digital audio signal 65A.

The bitstream 63A corresponding to the symbolic representation of each of the presenter's interactions, the bitstream 11A corresponding to the slide image data, and the bitstream 65A corresponding to the audio signal are coupled to synchronization block 66 and are synchronized according to the time stamp generated in blocks 64A-64C. In particular, the slide image data bitstream 11A and the symbolic representation bitstream 63A are synchronized to audio bitstream 64A dependent on the duration of the recorded audio signal. Timestamps are created within each of the received signals 13A, 14A, 11A by blocks 64A-64C and are retained with the corresponding bitstreams 63A, 11A, and 65A, respectively such that synchronization block 66 can synchronize the bitstreams according to the audio signal using the timestamps. This is in contrast to common synchronization techniques in which a separate system clock is used for synchronizing all of the signals. The advantage of synchronizing with respect to the audio bitstream instead of the system clock is that 1) a separate clock is not required for synchronization; 2) the audio signal represents an accurate timing of the duration of the presentation; 3) the system clock is not as accurate a timing tool of the presentation as the audio bitstream since it can become involved with other tasks and not reflect actual presentation duration time. As a result, synchronizing according to audio signal duration provides more robust presentation timing.

Bitstream Linking and Browsing

In one embodiment, the bitstreams are linked so as to make the multimedia data object browsable using a browsing interface so as to allow selection and viewing of individual slides within the slide presentation such that when a given slide is selected, each of bitstreams of the multimedia data object between the interval defining the given slide are played. Hence, the multimedia data object is browsable on a slide-by-slide basis.

In another embodiment, the bitstreams are linked so as to make the multimedia data object browsable on a presenter interaction event-by-event basis. In particular, the plurality of bitstreams further include a linking mechanism (represented by $L_1$ and $L_2$, FIGS. 3 and 5) such that when a user replays the multimedia data object and the location of a symbolic representation of a presenter's interaction is selected within a replayed slide, a portion of another bitstream that was captured at the same time that the presenter's interaction occurred during the real-time presentation is also replayed. For instance, referring to FIG. 3, if a viewer selects the location corresponding to a symbolic representation within a redisplayed slide occurring at $t_{o1}$ within displayed slide 1, audio 1 of bitstream 3 also begins playing at time $t_{o1}$ due to linking mechanism $L_1$.

In another embodiment, the symbolic interaction bitstream is linked to the multimedia data object video clip bitstream (FIG. 4) including a plurality of video clips captured during the real-time presentation. The video clips are captured in response to detected presenter interactions occurring while capturing the real-time presentation such that each of the plurality of video clips is associated with a presenter interaction that occurred during the capture of the real-time presentation. In this embodiment, the symbolic interaction bitstream is linked to a video clip bitstream such that when a slide is replayed within the multimedia data object and the location of a symbolic interaction event is selected within the slide, the video clip that was captured at the same time that the interaction event occurred during the real-time presentation is also replayed. For example, the presentation interaction event occurring at time $t_{o1}$ is linked to video clip V1 by linking mechanism L2 such that when the presentation interaction is replayed, the video clip is synchronously replayed. It should be further noted that each presentation interaction event can be linked to more than one of the plurality of bitstreams of the multimedia data object.

The linking mechanism can be embodied as a look-up table of pointers where an interaction event symbol pointer can be used to access the table to obtain a pointer to a tracked location within the other bitstream. For example, during the recording of the real-time presentation, a pointer can be assigned to each of the interaction event symbols. During subsequent viewing of the recording, the viewer can select with a user interface device (e.g., a mouse) an interaction event symbol within a slide. Upon selection, a browser interface application uses the pointer associated with the interaction event symbol to access a look-up table storing a plurality of pointers to tracked locations within the other bitstream. A pointer to a tracked location within the other bitstream is obtained corresponding to the interaction event symbol and is used to cause the browsing interface application to begin playing the other bitstream from the tracked location. The remainder of the plurality of bitstreams 15A are also synchronously replayed from the tracked location. Other techniques of linking bitstreams are well know in the field of digital circuit design.

Figure 7:
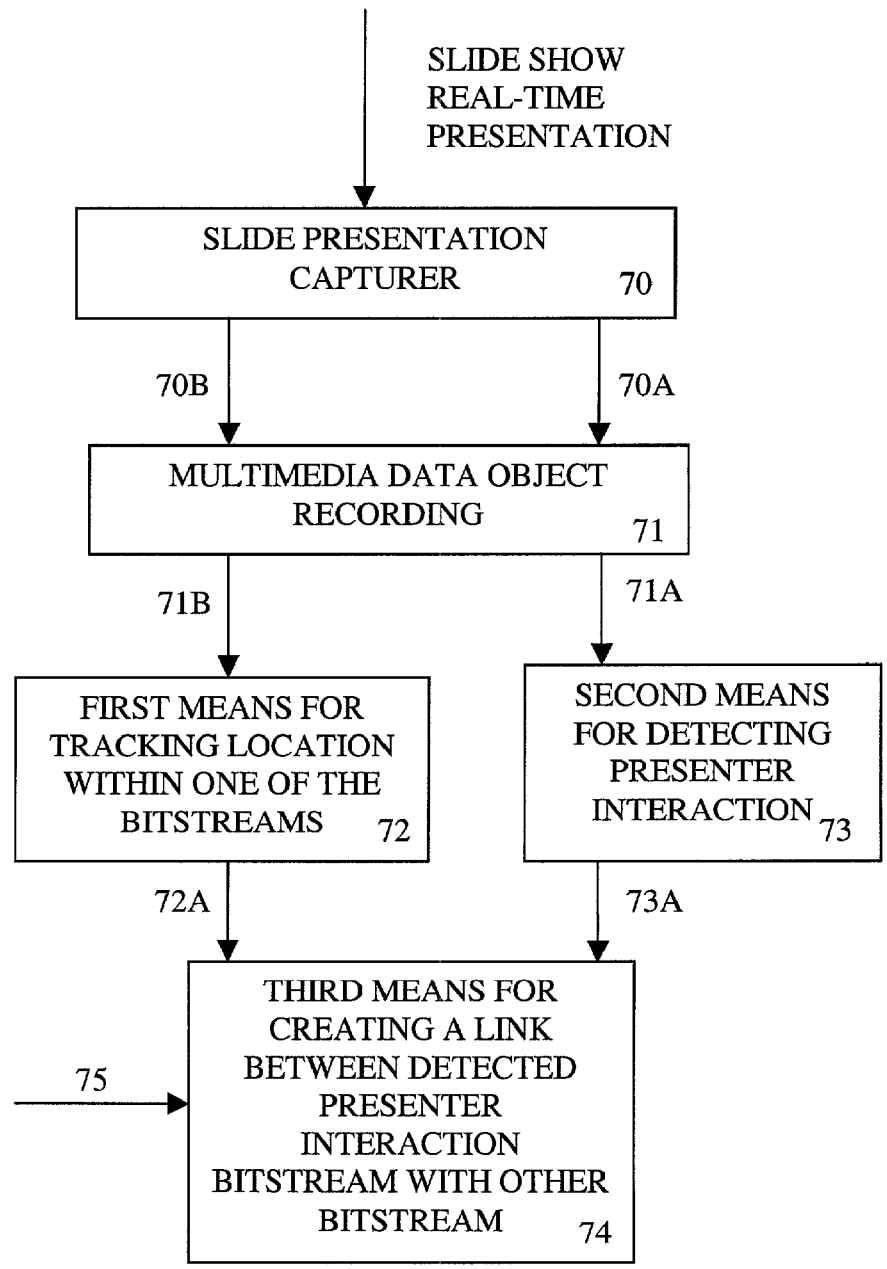
FIG. 7 illustrates a first embodiment of a system for creating a browsable multimedia data object in which the bitstreams are linked so as to make the multimedia data object browsable on a presenter interaction event-by-event basis.

FIG. 7 shows one embodiment of a system for generating a multimedia data object in which the bitstreams are linked so as to make the multimedia data object browsable on a presenter interaction event-by-event basis. According to the system a real-time slide presentation is captured by a slide presentation capturer (block 70) so as to obtain an image signal 70A corresponding to the displayed slides and the presenter in front of the displayed slides and an audio signal 70B corresponding to the presenter's speech. The image signal 70A is coupled to a multimedia data object recorder (block 71) that functions to generate the plurality of bitstreams representing the real-time slide presentation. One of the bitstreams 71B is coupled to a first means for tracking location (block 72) within the bitstream. The bitstream corresponding to the symbolic representation of the presenter interaction 71A is coupled to a second means for detecting a presenter interaction within a slide (block 73) so as to detect the occurrence of a presenter interaction event during the presentation. Bitstream tracking information 72A and presenter interaction event information 73A is coupled to a third means for linking each detected presenter interaction with a corresponding tracked location within the audio bitstream (block 74). In one embodiment, the bitstream can be tracked using a counter such that the occurrence of an interaction event is linked to a specific time within the bitstream. Alternatively, the bitstream location can be tracked by tracking the amount of data stored such that the occurrence of the interaction event is linked to a specific location within a data file storing the bitstream. In one embodiment, the event is linked to the tracked location within the bitstream using a lookup table or index such that when the event bitstream is replayed and an interaction event is selected the location of the event is used to point to a look-up table storing tracked locations within the tracked bitstream to determine where to begin replaying the bitstream. It should be understood that in one embodiment blocks 72-74 can be embodied within the multimedia data object recorder 71 wherein event detection and bitstream tracking occurs while generating the multimedia data object.

Figure 8:
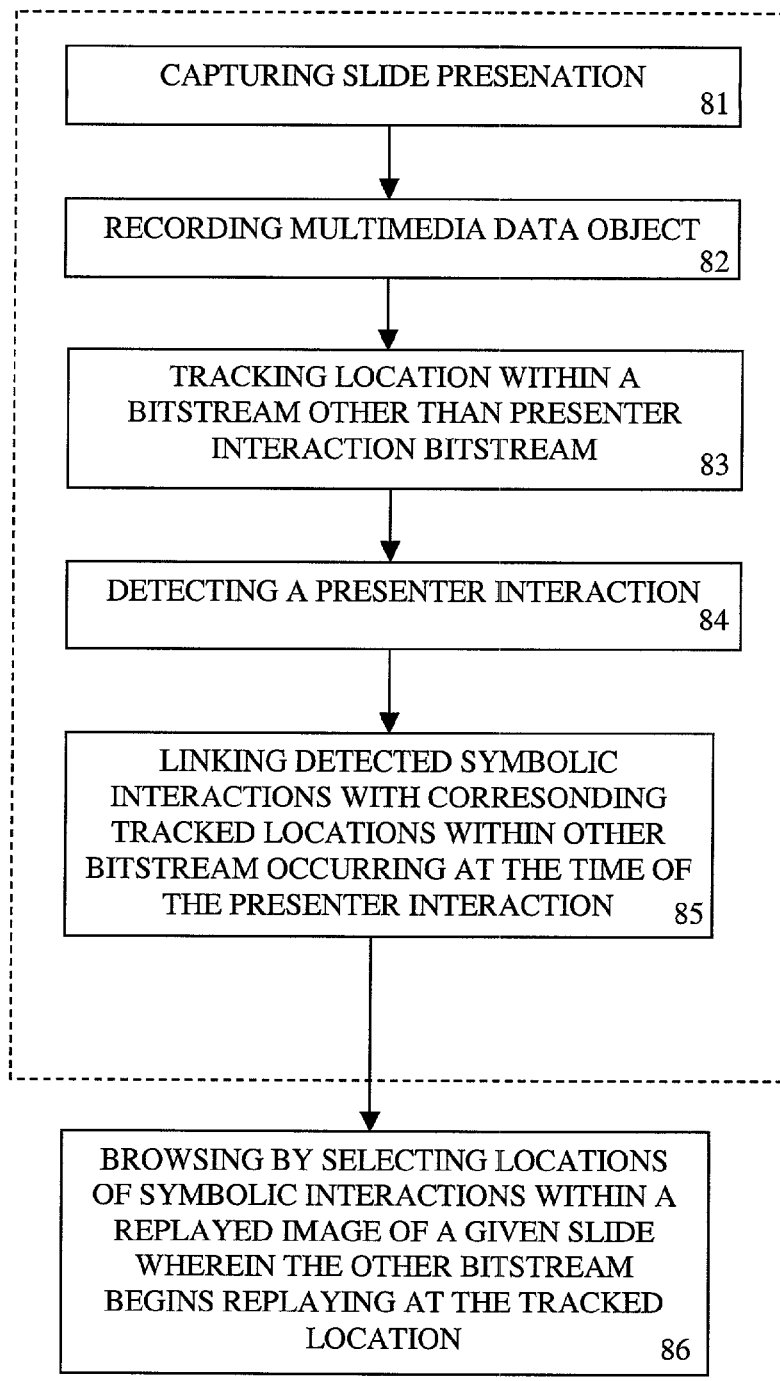
FIG. 8 illustrates a first embodiment of a method for creating and browsing a multimedia data object according to the present invention.

FIG. 8 shows a method for recording a multimedia data object and for browsing the multimedia data object on a presenter interaction event-by-event basis. Initially, the real-time presentation is captured so as to obtain an image signal and an audio signal (block 81) representing the presentation. A multimedia data object is generated (block 82) including a plurality of bitstreams where at least one of the bitstreams corresponds to the symbolic representation of the presenter's interaction. The location of the one of the plurality of bitstreams other than the interaction bitstream is tracked (block 83). In addition, presenter interactions within the interaction bitstream are detected (block 84). In response to a detected interaction, the corresponding tracked location within the other bitstream is linked with the symbolic representation of the detected interaction (block 85). Upon browsing of the multimedia data object and selecting (block 86) a location of the symbolic representation of the detected interaction within a redisplayed slide, the other bitstream begins replaying at the tracked location within the audio bitstream.

In the preceding description, numerous specific details are set forth in order to provide a thorough understanding of the present invention. It will be apparent, however, to one skilled in the art that these specific details need not be employed to practice the present invention. In other instances, well-known techniques have not been described in detail in order to avoid unnecessarily obscuring the present invention.

In addition, although elements of the present invention have been described in conjunction with certain embodiments, it is appreciated that the invention can be implement in a variety of other ways. Consequently, it is to be understood that the particular embodiments shown and described by way of illustration is in no way intended to be considered limiting. Reference to the details of these embodiments is not intended to limit the scope of the claims which themselves recited only those features regarded as essential to the invention.

We claim:

1. A data file tangibly embodied in a computer readable storage medium comprising:
   a plurality of overlayed replayable sets of data representing a real-time slide presentation captured by an image capture device and audio signal capture device including at least:
   a first set of data corresponding to an image of each of a plurality of slides of the slide presentation;
   a second set of data corresponding to symbolic representations of a presenter's interaction with each slide captured during the presentation;
   a third set of data corresponding to an audio signal of the presentation captured during the presentation; wherein the sets of data are synchronized and replayable on a slide-by-slide basis;
   links between the symbolic representations of the presenter's interactions within the second set of data to a corresponding location within another of the plurality of sets of data such that selection of a symbolic representation within the replayed slide causes the replaying of the other of the plurality of sets of data at the corresponding linked location.

2. The data file as described in claim 1 wherein the other set of data is the third set of data.

3. The data file as described in claim 1 further comprising a fourth set of data corresponding to a plurality of video clips.

4. The data file as described in claim 3 wherein the plurality of video clips are captured during the real-time slide presentation dependent on detected presenter interactions and wherein the other of the plurality of sets of data is the fourth set of data such that selection of a symbolic representation within the replayed slide causes the replaying of an associated video clip within the fourth set of data.

5. The data file as described in claim 1 wherein the link comprises a look-up table for storing pointers into the other set of data.

6. The data file as described in claim 1 further comprising:
   a data file unit configured to automatically locate a point of interest based upon the presenter's interaction with each slide and to automatically insert a digital symbol representing the presenter's interaction into the second set of data.

7. A system of creating a browsable multimedia data object comprising:
   means for recording a real-time slide presentation using an image capture device and audio signal capture device and generate a plurality of overlayed replayable bitstreams corresponding to the multimedia data object including at least a first bitstream corresponding to an image of each of a plurality of slides of the slide presentation, a second bitstream corresponding to a symbolic representation of a presenter's interactions with the slides, and a third bitstream corresponding to an audio signal of the real-time slide presentation;

means for tracking location within one of the plurality of bitstreams while recording the multimedia data object;

means for detecting a presenter interaction with a region of interest within a slide while capturing the multimedia data object, the detected presenter interaction having a corresponding symbolic interaction event within the symbolic interaction bitstream; and means for linking the symbolic interaction event with a corresponding tracked location occurring within the one bitstream at the time of the symbolic interaction event, wherein selection of a symbolic representation within the replayed slide causes the replaying of another bitstream.

8. The system as described in claim 7 wherein the other bitstream is the third bitstream.

9. The system as described in claim 7 wherein the plurality of bitstreams includes further a fourth bitstream corresponding to a plurality of video clips of the real-time slide presentation and the other bitstream is the fourth bitstream.

10. The system as described in claim 9 wherein the plurality of video clips are captured during the real-time slide presentation dependent on detected presenter interactions and wherein the other of the plurality of bitstreams is the fourth bitstream such that selection of a symbolic representation within the replayed slide causes the replaying of an associated video clip within the fourth bitstream.

11. The system as described in claim 7 further comprising:
means for identifying the region of interest; and
means for generating symbolic representations of the region of interest identified by the means for identifying.

12. A system comprising:
a computing system for generating an image signal corresponding to a plurality of slides;
a display system for displaying the image signal corresponding to the slides within a display area;
a capture device for capturing at least an image of a real-time slide presentation including an image of the plurality of slides and an image of a presenter interacting with each of the slides and for capturing presenter audio, to generate captured signals;
means for creating a plurality of overlayed synchronously replayable bitstreams corresponding to the multimedia data object from the computer generated image signal, the captured signals, the plurality of bitstreams including at least a bitstream corresponding to the image of each of a plurality of slides of the slide presentation, a bitstream corresponding to a presenter's interactions with each of the slides, and a bitstream corresponding to a presenter's audio contribution;
a counter for tracking location within at least one of the captured signals while being captured;
a detector for detecting the occurrence of a presenter interaction during the real-time presentation, each interaction having a corresponding symbolic interaction event within the symbolic interaction bitstream;
a lookup table for storing a first indicator representative of the symbolic interaction event corresponding to the detected presenter interaction within the interaction bitstream and a second indicator representative of a location within one of the plurality of bitstreams corresponding to a tracked location within one of the capture signals occurring at the time of the detected presenter interaction, the first and second indicators being linked such that, when the multimedia data object is replayed, selection of the symbolic interaction event within the image of one of the slides causes the audio bitstream to be played at the tracked location.

13. The system as described in claim 12 wherein the counter is a timer.

14. The system as described in claim 12 wherein the counter is tracks the amount of audio data stored.

15. A method of creating a browsable data file having a plurality of overlayed replayable sets of data including at least a set of data corresponding to an image of each of a plurality of slides of the slide presentation, a set of data corresponding to a presenter's symbolic interaction with points of interest within each slide, and a set of data corresponding to a presenter's audio associated with each slide, the method comprising:
tracking location within the audio set of data;
detecting a presenter interaction with a point of interest within a slide while capturing the data file, said presenter interaction being represented as a symbolic interaction within the symbolic interaction set of data;
linking the symbolic interaction with a corresponding tracked location within the audio stream occurring at the time of the presenter interaction; and
browsing the data file while replaying by selecting the symbolic interaction within a replayed image of a slide wherein the set of data corresponding to the presenter's audio begins replaying at the tracked location within the set of data corresponding to the presenter's audio.

* * * * *